Figure 4:
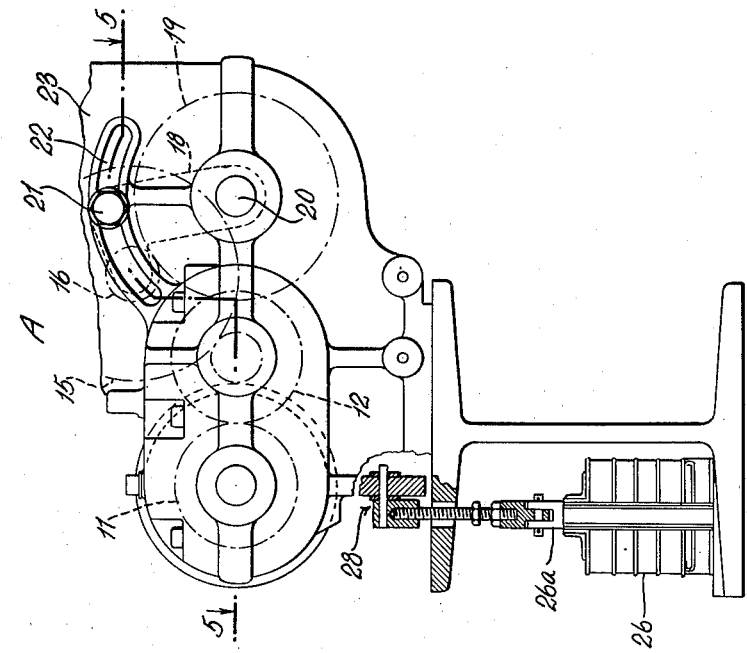

Sept. 7, 1948.  G. G. SCHNEIDER ET AL  2,448,916
HEATER FOLDING MACHINE
Filed Nov. 7, 1944  14 Sheets-Sheet 1
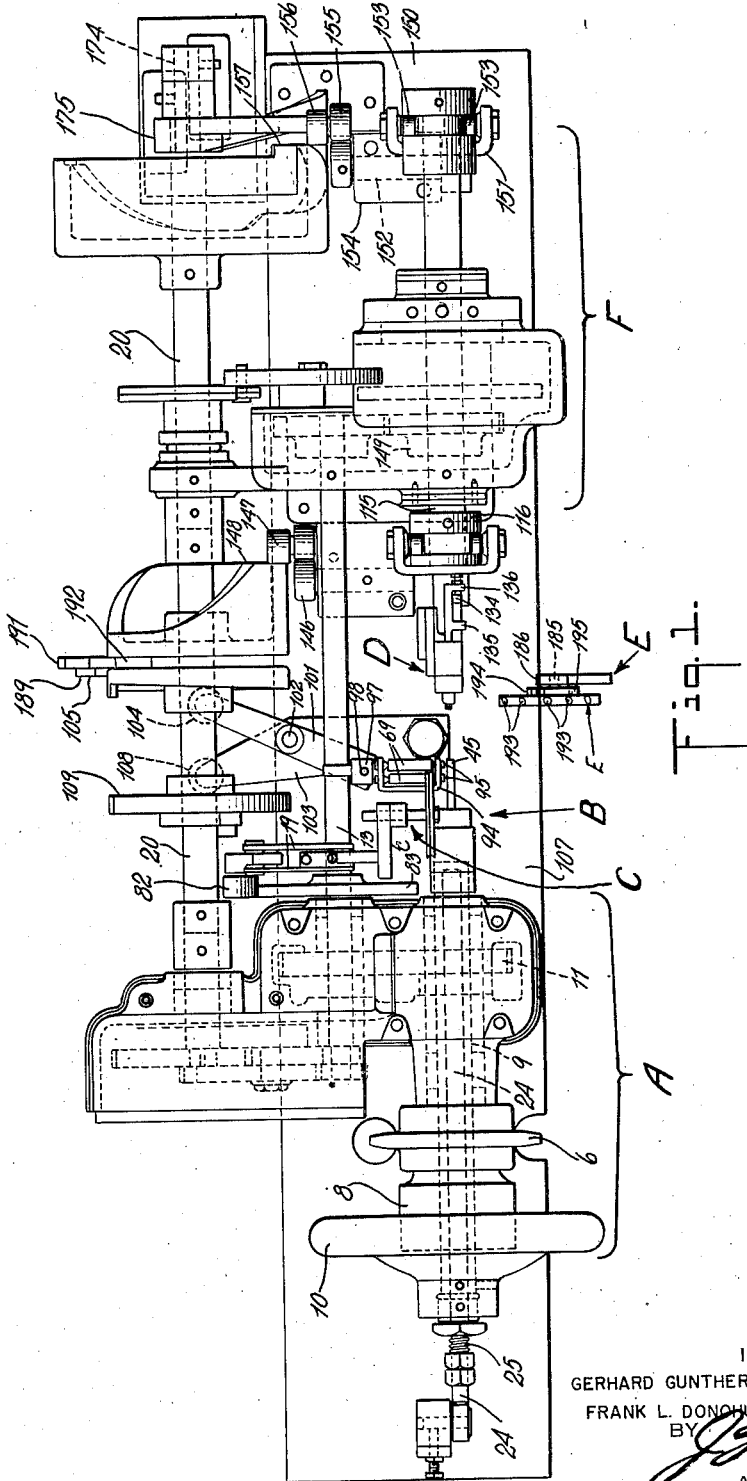
Fig. 1.
INVENTOR
GERHARD GUNTHER SCHNEIDER
FRANK L. DONOHUE
BY 
ATTORNEY Sept. 7, 1948.  G. G. SCHNEIDER ET AL  2,448,916
HEATER FOLDING MACHINE
Filed Nov. 7, 1944  14 Sheets-Sheet 2
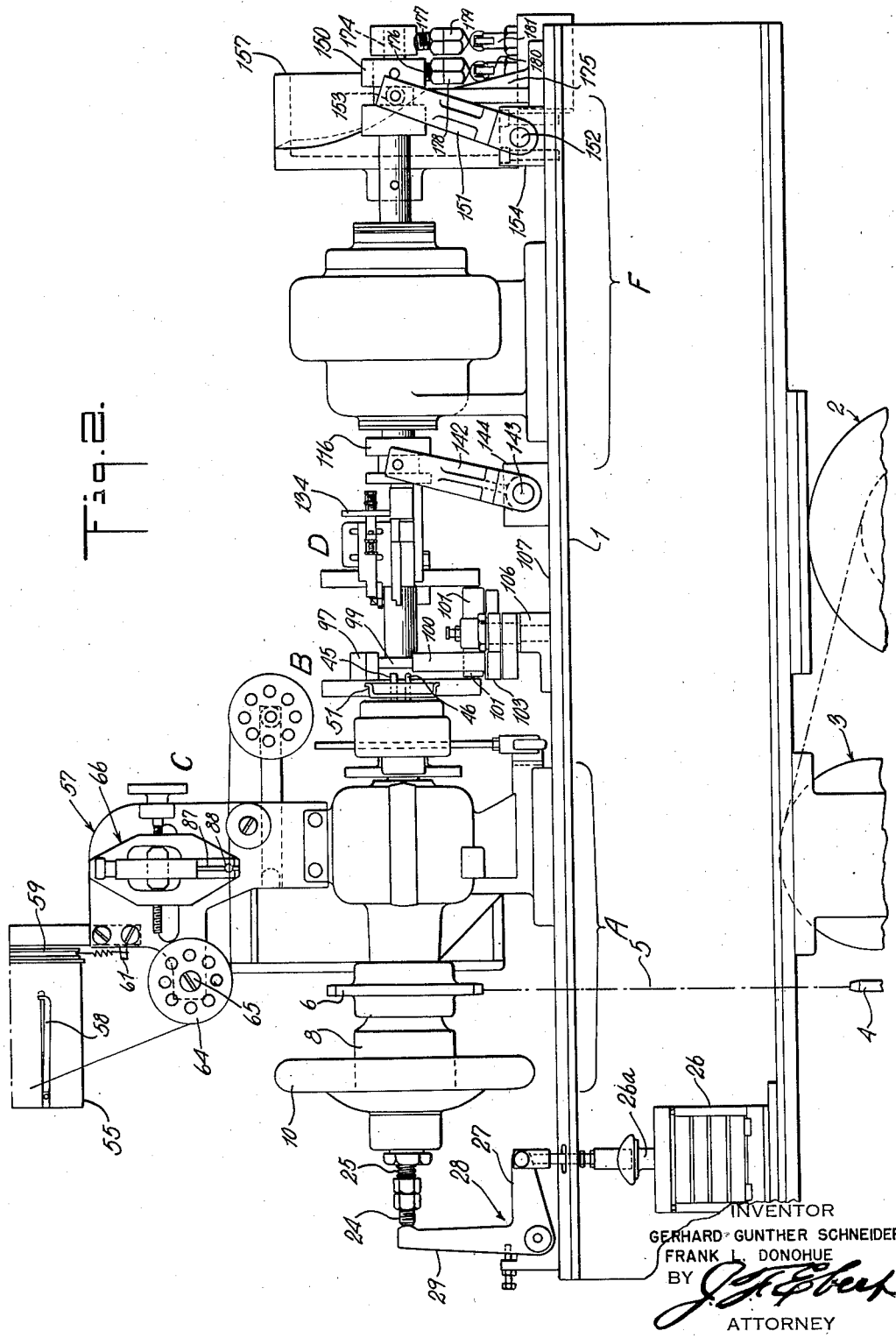
INVENTOR
GERHARD GUNTHER SCHNEIDER
FRANK L. DONOHUE
BY
ATTORNEY Sept. 7, 1948.  G. G. SCHNEIDER ET AL  2,448,916
HEATER FOLDING MACHINE Filed Nov. 7, 1944  14 Sheets-Sheet 3

INVENTOR
GERHARD GUNTHER SCHNEIDER
FRANK L. DONOHUE
BY
ATTORNEY

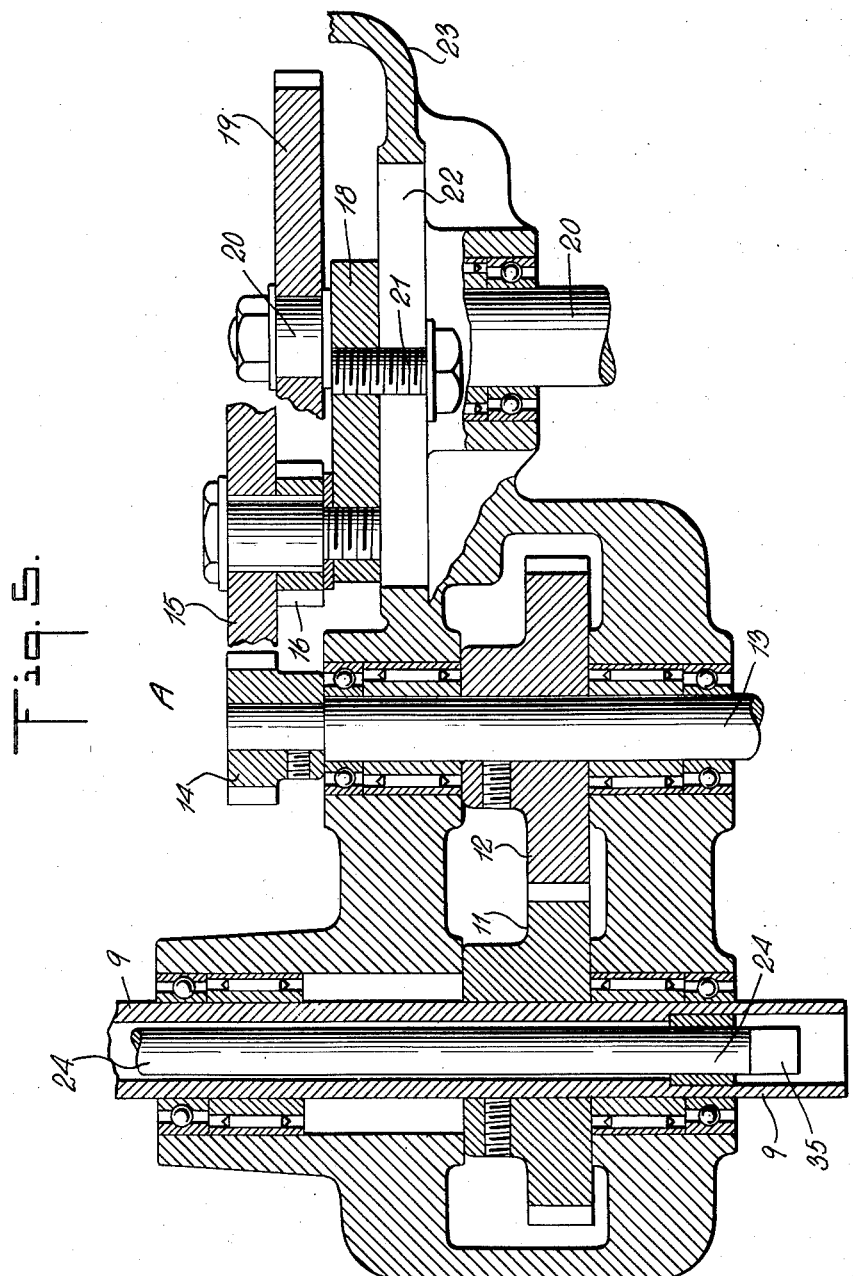

Sept. 7, 1948.    G. G. SCHNEIDER ET AL    2,448,916
HEATER FOLDING MACHINE
Filed Nov. 7, 1944    14 Sheets-Sheet 5
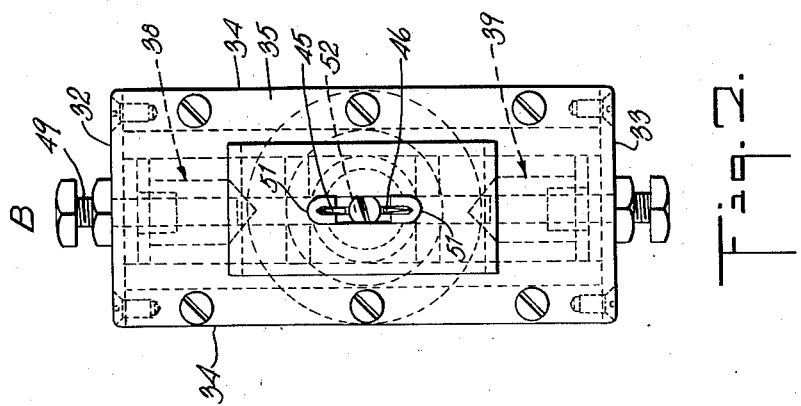
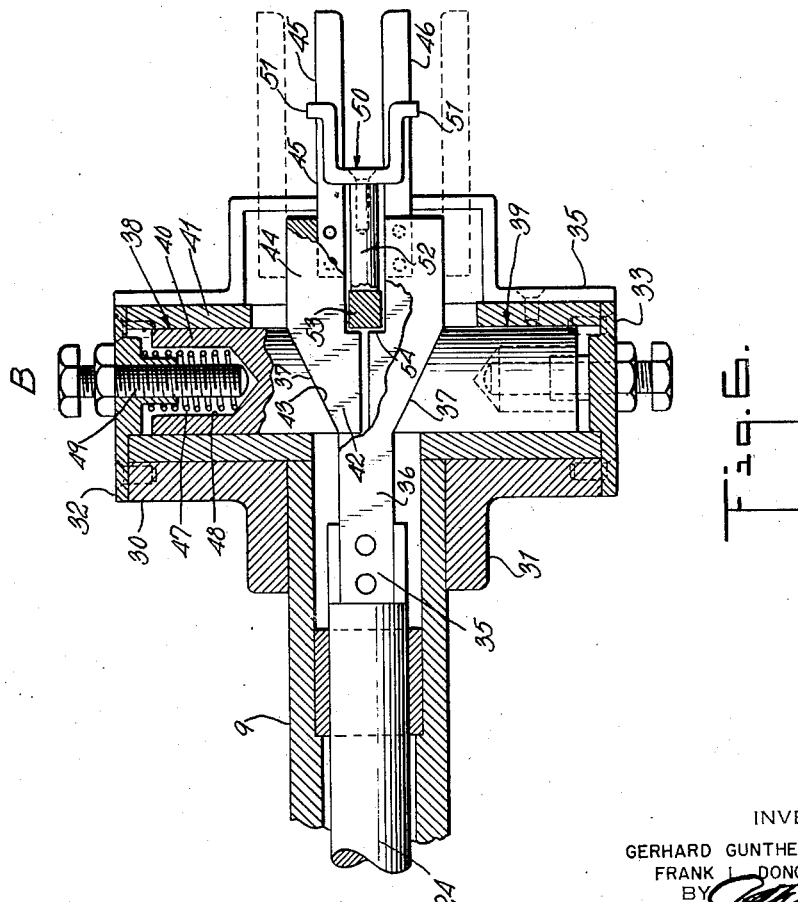
INVENTOR
GERHARD GUNTHER SCHNEIDER
FRANK L. DONOHUE
BY
ATTORNEY

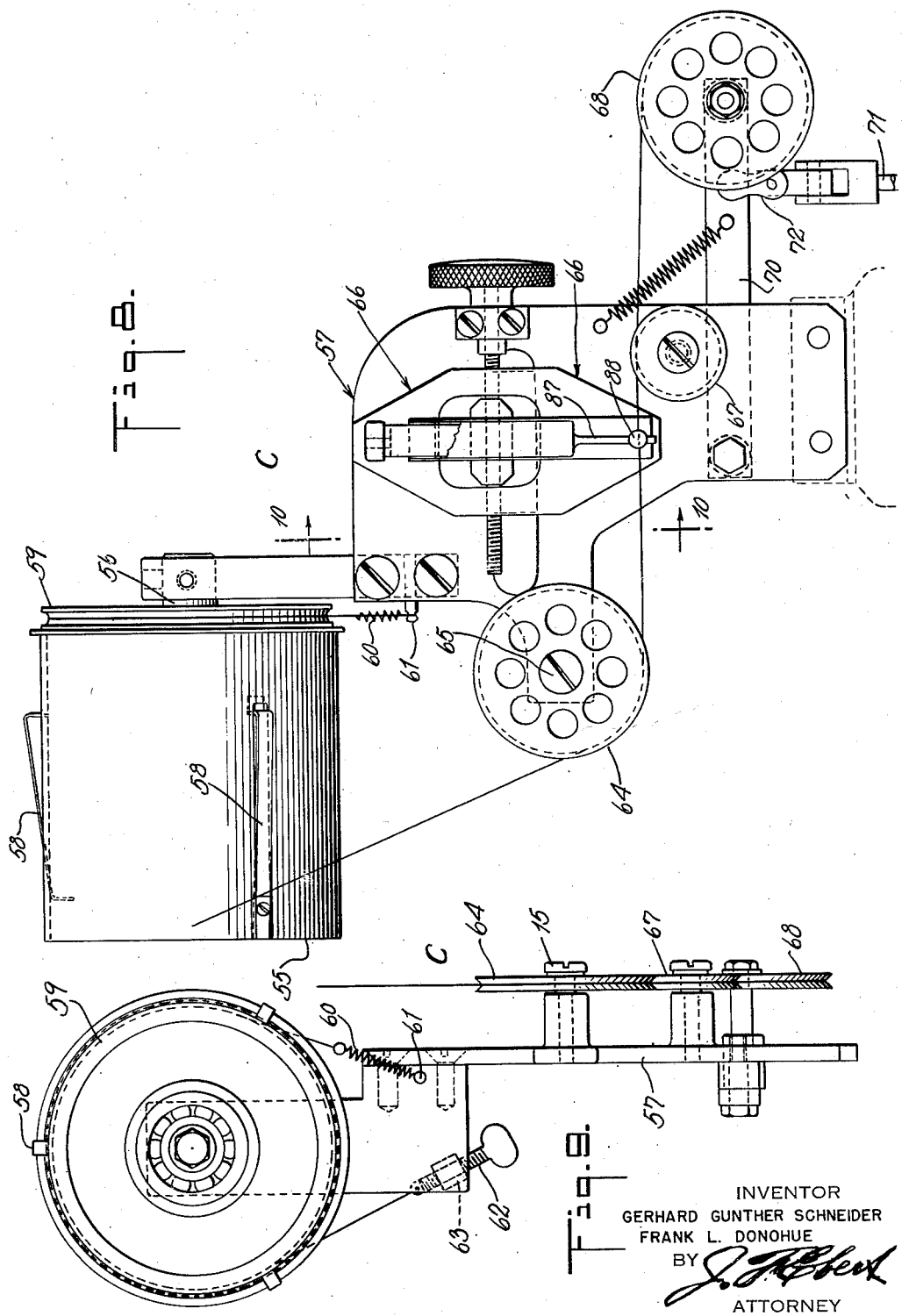

Sept. 7, 1948.   G. G. SCHNEIDER ET AL   2,448,916
HEATER FOLDING MACHINE
Filed Nov. 7, 1944   14 Sheets-Sheet 7
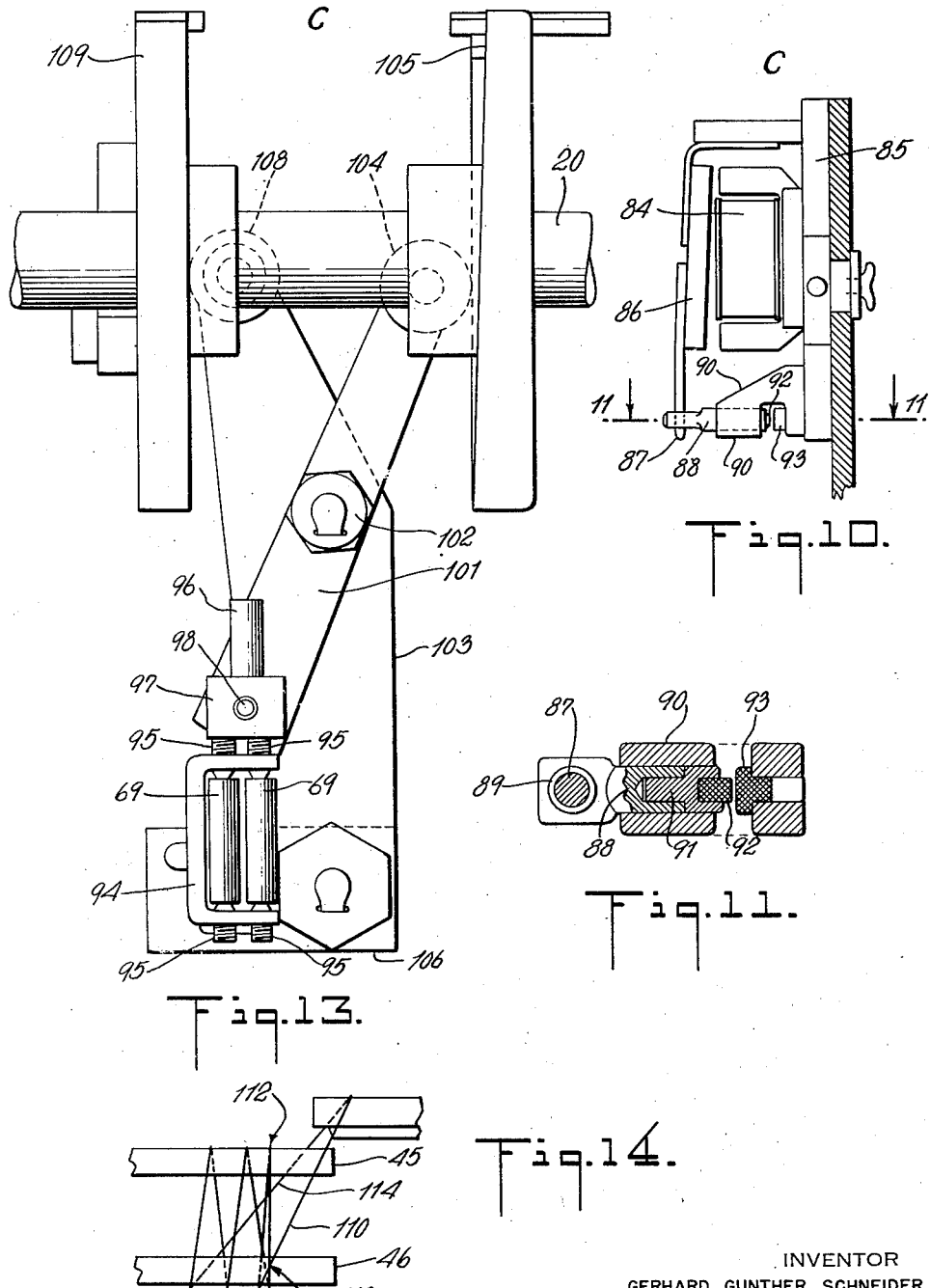
INVENTOR
GERHARD GUNTHER SCHNEIDER
FRANK L. DONOHUE
BY
ATTORNEY

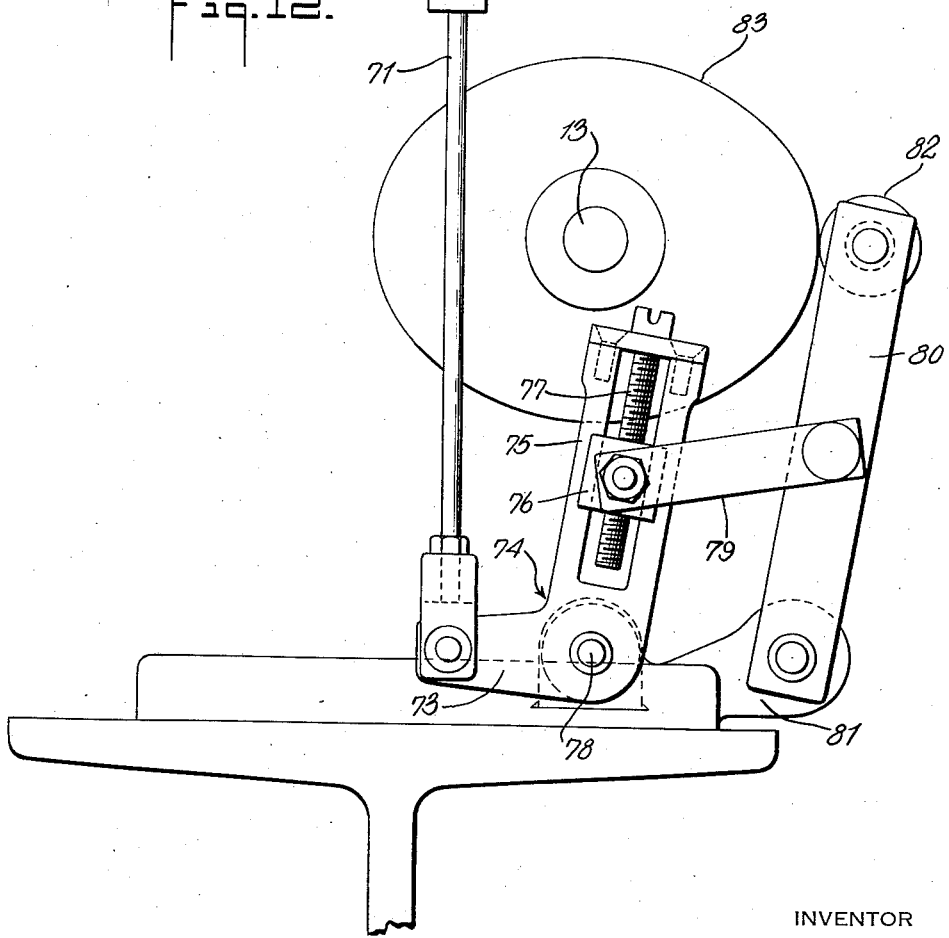

Sept. 7, 1948. G. G. SCHNEIDER ET AL 2,448,916
HEATER FOLDING MACHINE
Filed Nov. 7, 1944 14 Sheets-Sheet 9

INVENTOR
GERHARD GUNTHER SCHNEIDER
FRANK L. DONOHUE
BY
ATTORNEY

Sept. 7, 1948. G. G. SCHNEIDER ET AL 2,448,916
HEATER FOLDING MACHINE
Filed Nov. 7, 1944 14 Sheets-Sheet 10

INVENTOR
GERHARD GUNTHER SCHNEIDER
FRANK L. DONOHUE
BY
ATTORNEY

Sept. 7, 1948.   G. G. SCHNEIDER ET AL   2,448,916
HEATER FOLDING MACHINE

Filed Nov. 7, 1944                    14 Sheets-Sheet 12

INVENTOR
GERHARD GUNTHER SCHNEIDER
FRANK L. DONOHUE
BY
ATTORNEY

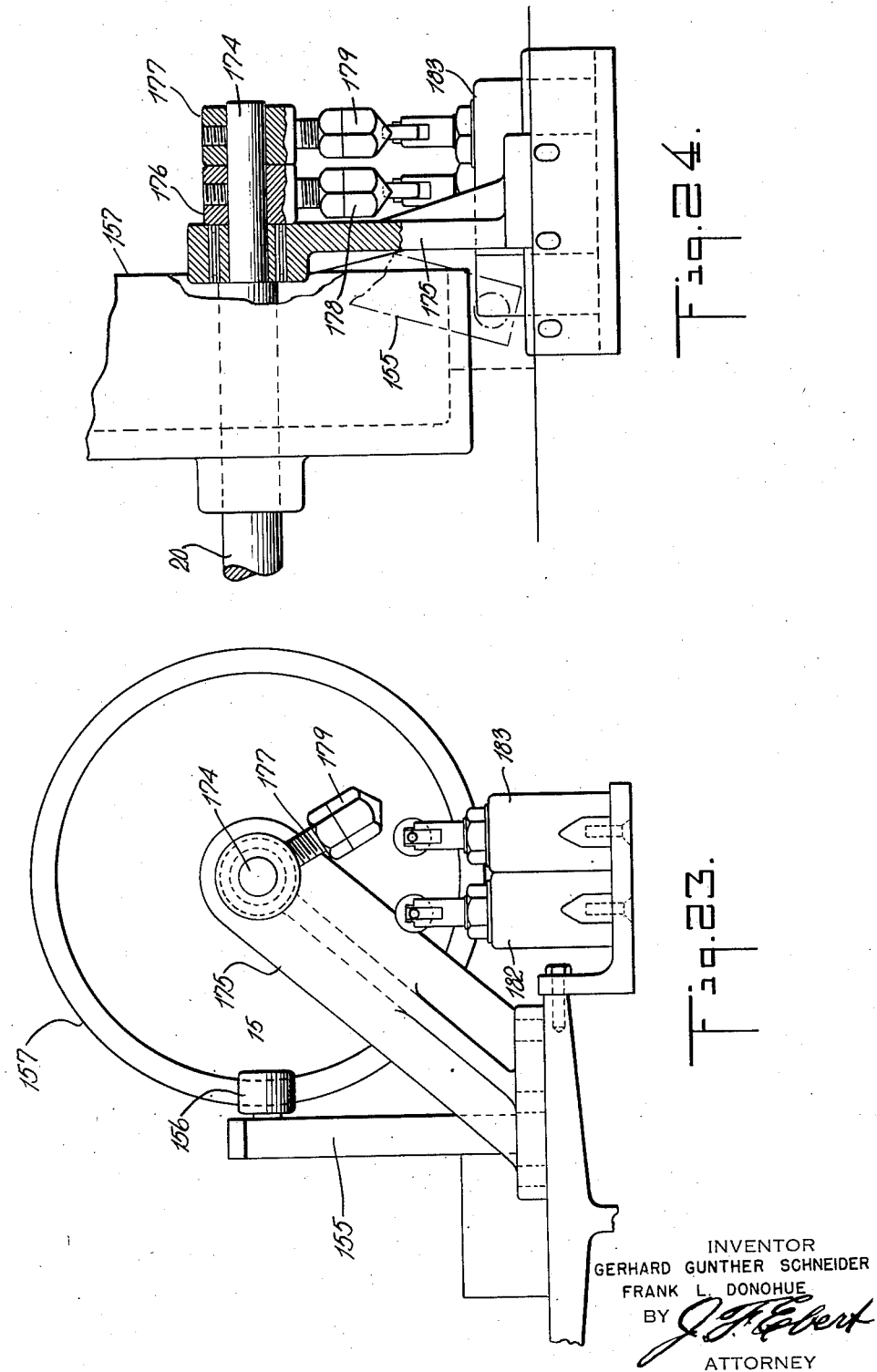

Sept. 7, 1948.  G. G. SCHNEIDER ET AL  2,448,916
HEATER FOLDING MACHINE
Filed Nov. 7, 1944  14 Sheets-Sheet 14
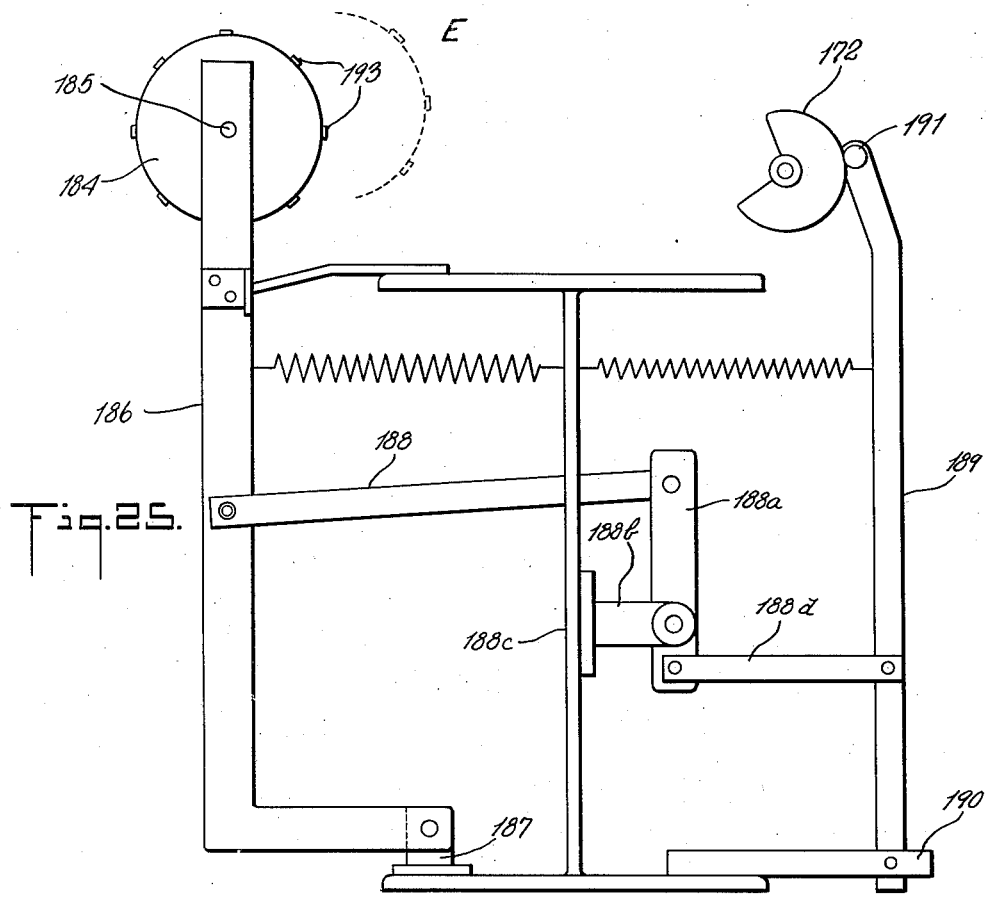
Fig. 25.
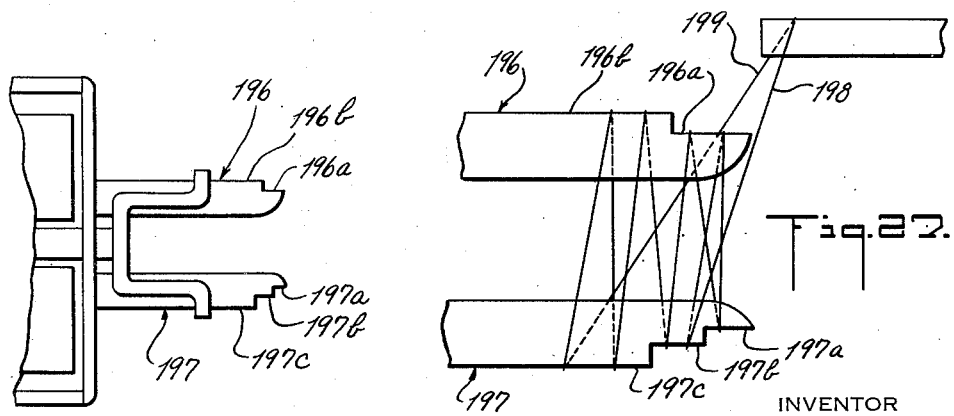
Fig. 26.  Fig. 27.
INVENTOR
GERHARD GUNTHER SCHNEIDER
FRANK L. DONOHUE
BY 
ATTORNEY Patented Sept. 7, 1948

2,448,916

UNITED STATES PATENT OFFICE 2,448,916

HEATER FOLDING MACHINE

Gerhard Gunther Schneider and Frank L. Donohue, Maplewood, N. J., assignors to National Union Radio Corporation, Newark, N. J., a corporation of Delaware Application November 7, 1944, Serial No. 562,356

14 Claims. (Cl. 140—71.5)

1

The invention herein disclosed relates to a machine for folding wire to form folded filaments such as those that are used in radio vacuum tubes.

A folded filament is used, for example, as the heating element of the cathode of a vacuum tube, and is usually in the form of a zig-zag or M-shaped fold. This filament consists of a predetermined length of a particular size wire, in accordance with the ohmic value desired, folded upon itself. It is inserted in a container, such for example as a cathode sleeve. Generally, the wire of which such filaments are made is a coated wire of extremely small diameter, ranging from approximately one thousandth of an inch in diameter to ten thousandths of an inch. Heretofore, and prior to the invention herein disclosed, said filaments were folded manually, and manually inserted into the receptacle. This is a tiresome, tedious, slow and expensive method of forming and inserting such filaments. Various attempts have been made to effect the folding of such filaments mechanically. Although much time and money has been expended to that end, such attempts as have been made have met with indifferent success and have not been accepted.

An object of this invention is to provide a machine for folding such filaments and inserting the folded filaments into a receptacle. Another object of the invention is to provide such a machine in which the filament folding mechanism operates continuously. A further object of the invention is to provide a machine of the kind mentioned which may be operated by unskilled labor and which requires a minimum of maintenance.

The foregoing objects and certain advantages, that will hereinafter appear, are realized in the embodiment of the invention illustrated in the accompanying drawings and described in detail below, from which description a clearer understanding of the invention may be had.

Figure 3:
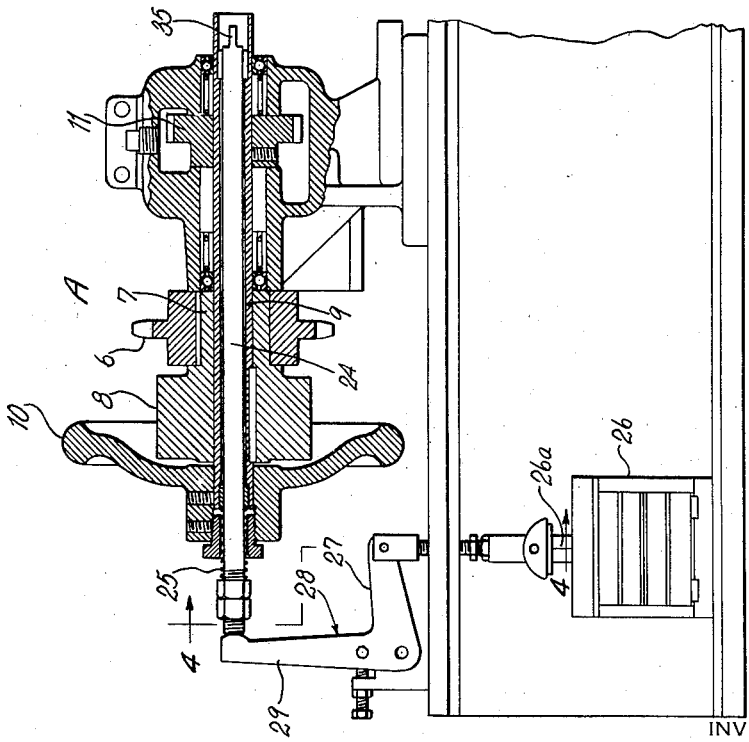
Figure 15:
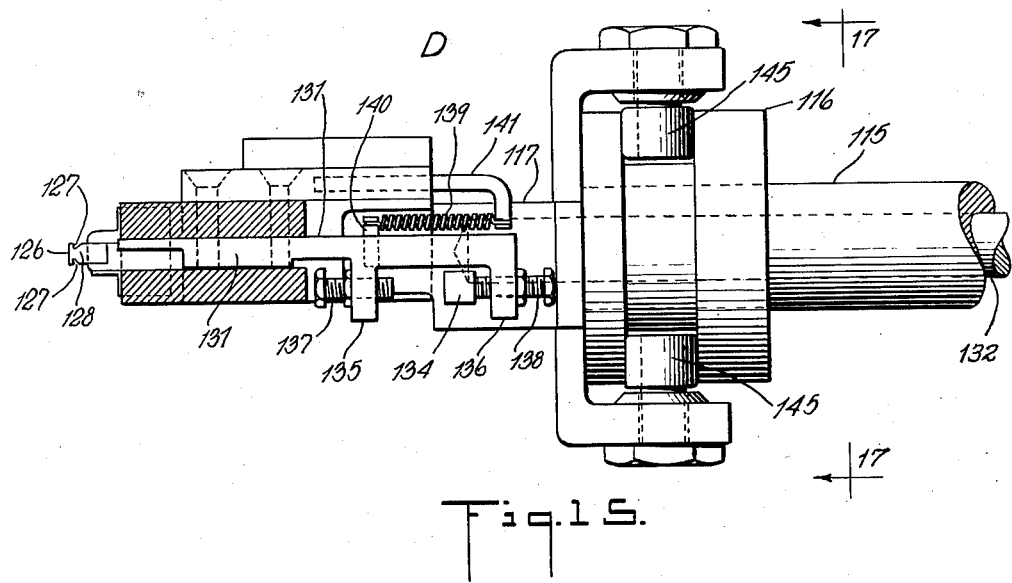
Figure 16:
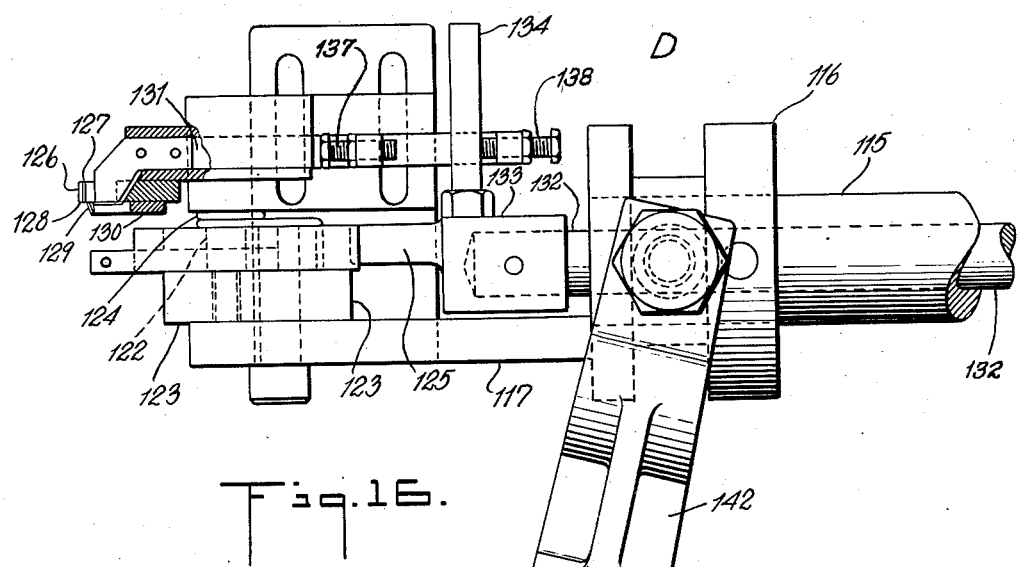
Figure 17:
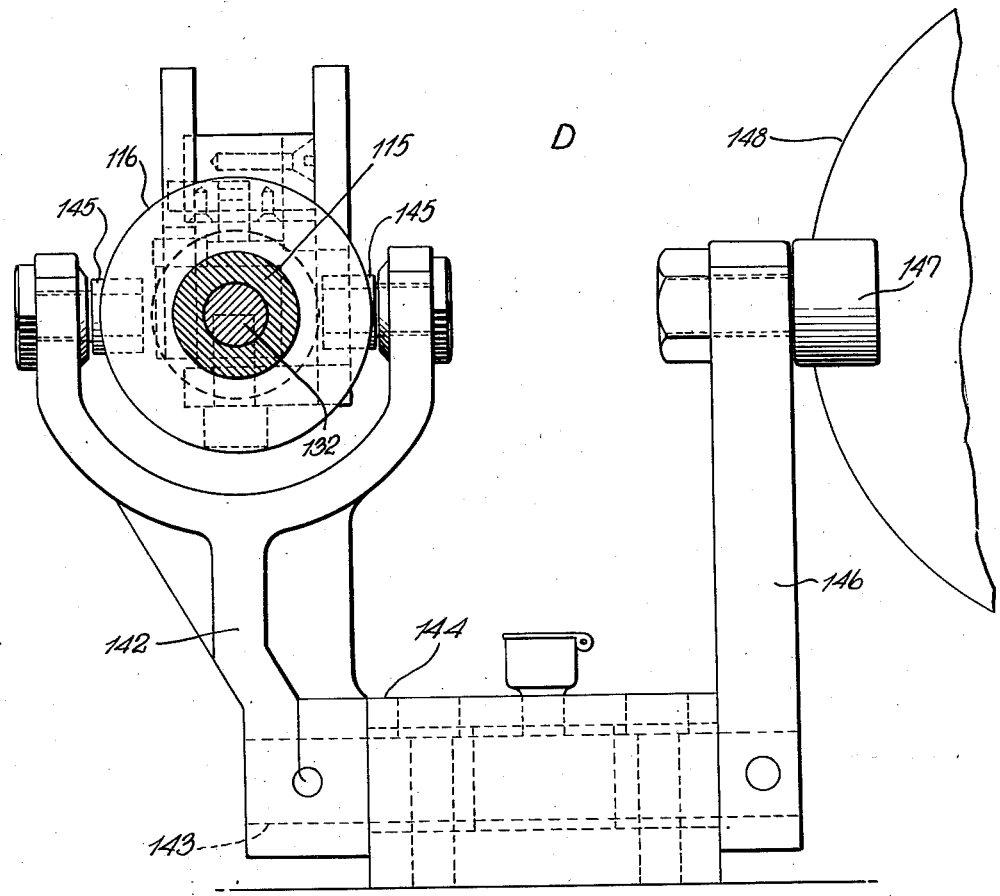
Figure 18:
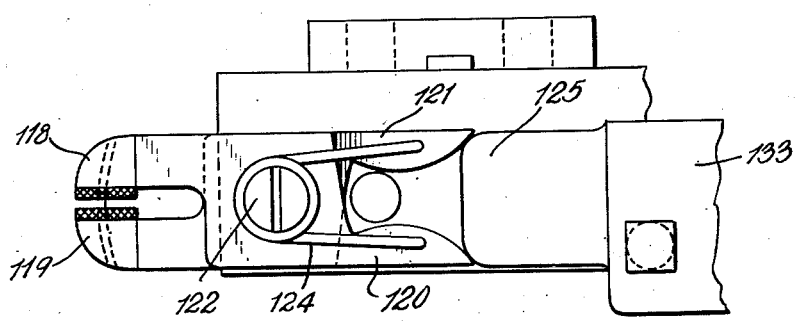
Figure 19:
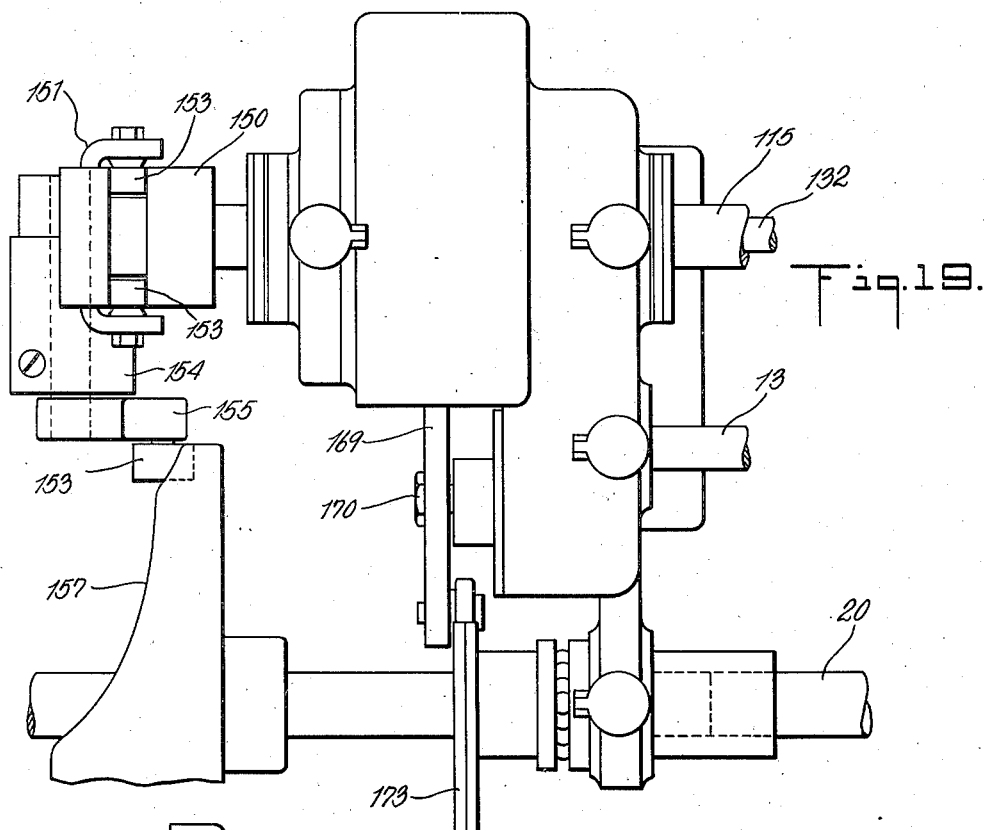
Figure 20:
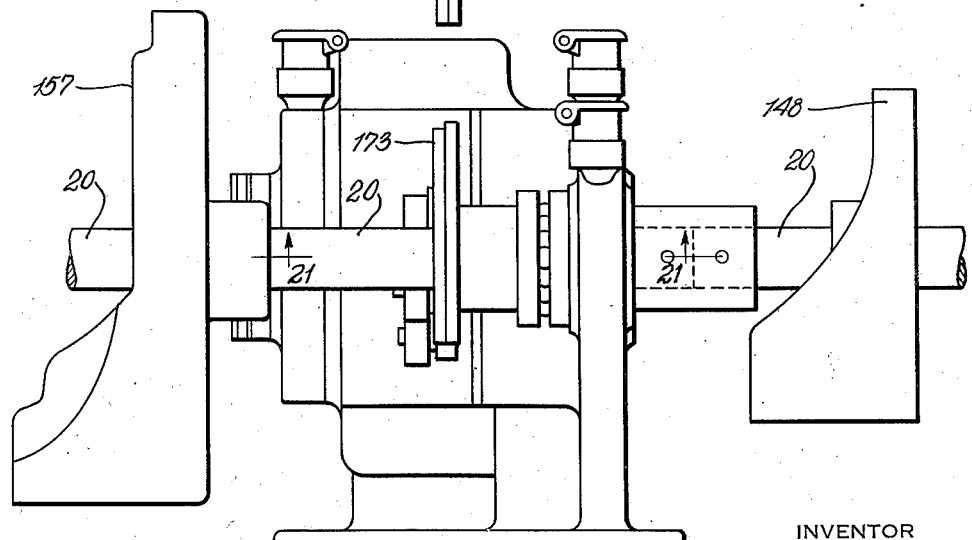
Figure 21:
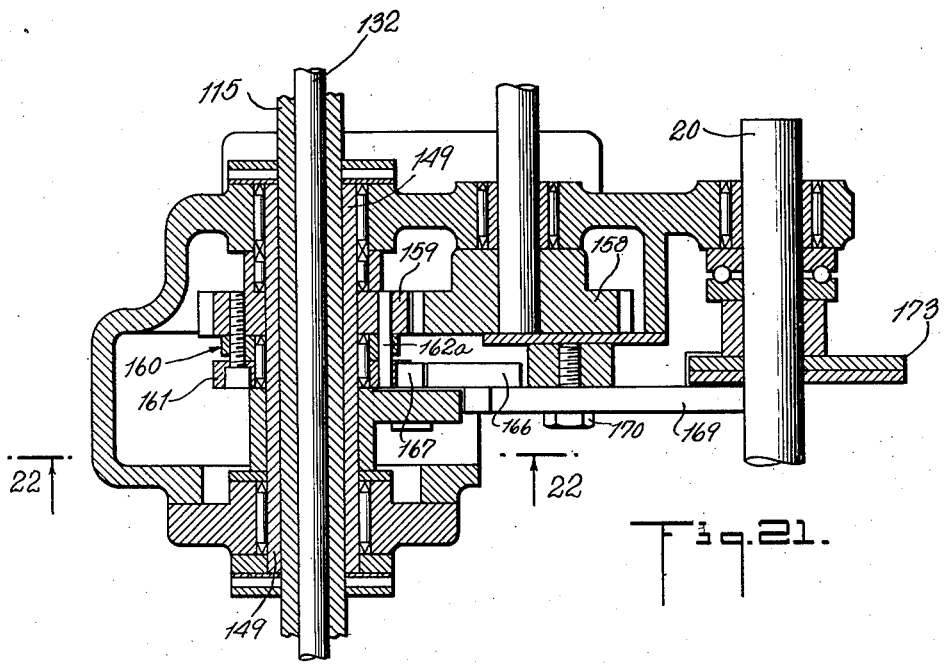
Figure 22:
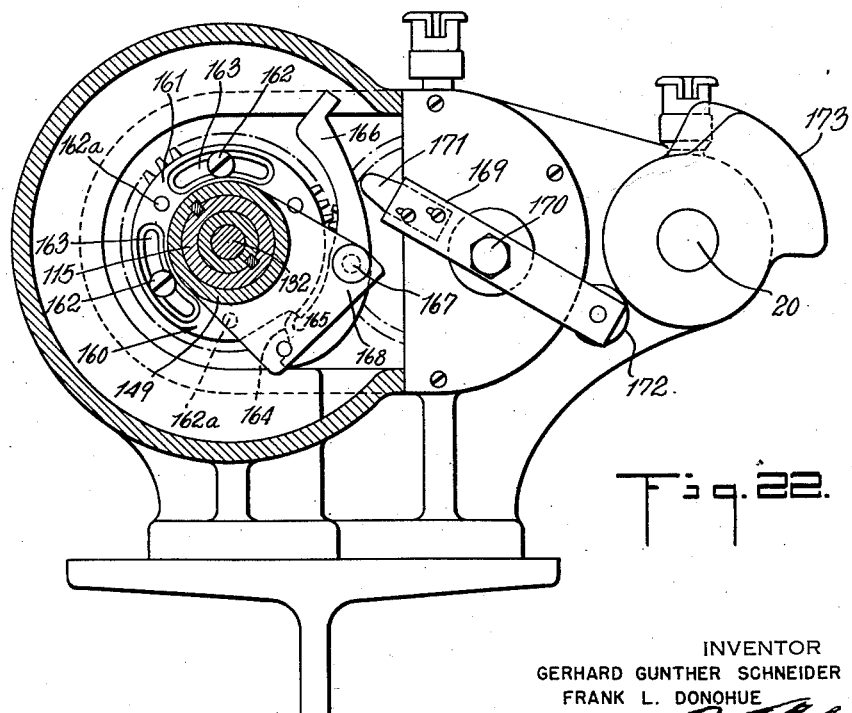

The drawings include:

Fig. 1 which is a plan of a machine embodying the invention;

Fig. 2 which is a front (the side facing the operator) elevation of the same;

Fig. 3 which is a sectional elevation of the head stock on an enlarged scale;

Fig. 4 which is an end elevation, partly broken away, of the same taken on the line 4—4 of Fig. 3;

Fig. 5 which is a partial sectional plan taken on the irregular line 5—5 of Fig. 4;

Fig. 6 which is a sectional elevation, on an enlarged scale, of the winding head which is mounted on the head stock;

Fig. 7 which is an end elevation of the same;

Fig. 8 which is a side elevation of the wire feed assembly on an enlarged scale;

Fig. 9 which is an end elevation of the same;

Fig. 10 which is a section taken on the line 10—10 of Fig. 8;

Fig. 11 which is a section taken on the line 11—11 of Fig. 10;

Fig. 12 which is an elevation of the velocity compensation mechanism of the wire feed;

Fig. 13 which is a partial plan, on an enlarged scale, of the wire feed guide rollers;

Fig. 14 which is a diagrammatic representation of the section of the wire feed guide for one particular folded filament;

Fig. 15 which is a partial plan, on an enlarged scale, of the knife and jaw assembly;

Fig. 16 which is a side elevation of the same;

Fig. 17 which is a partial, sectional end elevation of the same taken on the line 17—17 of Fig. 15;

Fig. 18 which is an enlarged partial section of the jaws;

Fig. 19 which is a plan, on an enlarged scale, of the tail stock of the machine;

Fig. 20 which is a side elevation of the same;

Fig. 21 which is a section taken on the line 21—21 of Fig. 20;

Fig. 22 which is a section taken on the line 22—22 of Fig. 21;

Fig. 23 which is an end elevation of certain electric cams and switches;

Fig. 24 which is a sectional elevation of the same;

Fig. 25 which is a detail elevation of the receiving dial operating mechanism;

Fig. 26 which is a fragmentary elevation of the winding head with stepped blades therein; and Fig. 27 which illustrates the folding of a filament over stepped blades.

The machine illustrated in the drawings constitutes a preferred, but only one example of an, embodiment of the invention. This machine is of such size that it may be and in the illustrated embodiment is, mounted upon a table 1. In general, the machine comprises a head stock A (Figs. 1, 2, 3, 4 and 5) through which various shafts and spindles are driven in proper relative speeds. On one end of the head stock, a rotatable winding head B (Figs. 1, 2, 6 and 7) is mounted. On this winding head, the wire is wound to form a continuous series of folded filaments. The wire is fed to the winding head through wire feed mechanism C (Figs. 1, 2, 8, 9, 10, 11, 12 and 13) which is mounted adjacent to and in part above the head stock A. When the desired number of folds are wound, a knife and take-off head D (Figs. 1, 2, 15, 16 and 17) moves in, anchors the wire for the start of another filament, clips the wire and removes the folded filament from the winding head. The take-off head then positions the folded filament to be received in the receptacle of a dial receiver E. The action of the take-off head D is controlled through the mechanism of a tail stock F.

In operation, the various shafts are driven, in proper relative relation, through the head stock A, by a prime mover, desirably an electric motor 2. The motor 2 is connected through a belt to a speed reducer gear 3, of a kind well-known in the art. A sprocket 4 is mounted on the output shaft of the reducer gear 3 and through a chain 5 connected to a sprocket 6 loosely mounted on an extension bushing 7 of a clutch 8. The clutch 8 connects the drive sprocket 6 to a drive shaft 9. The clutch 8 may be any of the well-known types of clutches, and it is, therefore, not shown in detail. The clutch is manually actuated to connect the sprocket 6 to the shaft 9. For observation and adjustment, a hand wheel 10 is secured to the shaft 9 for rotation therewith and through which the machine may be manually turned over.

The head stock A (Figs. 3, 4 and 5) includes the shaft 9 which is a hollow shaft or sleeve. This shaft is connected, through the clutch 8, to the motor 2, and when the machine is power driven the shaft 9 is continuously rotated. On the shaft 9, there is mounted, for rotation therewith a spur gear 11. This gear meshes with a gear 12 (Figs. 4 and 5) secured on a shaft 13 (Figs. 1, 4 and 5). On one end of the shaft 13, there is secured a spur gear 14 which meshes with a change gear 15. This change gear 15 is mounted with a pinion 16 on a stub shaft 17 extending from a lever 18. A gear 19, mounted on a shaft 20 meshes with the pinion 16. The lever 18, on which the gear 15 and pinion 16 are mounted, is pivoted at one end on the shaft 20 and positioned by a clamp screw 21 extending through a slot 22 in a wall 23 of the gear housing. This arrangement is an old and well-known construction for changing gears to effect a different ratio between the rotation of a main or drive shaft, such as the shaft 9, and another shaft such as the shaft 20. In this manner, and through the train of gears above described, the shafts 1 and 13 are driven, or rotated, in a one to one ratio, and the shaft 20 is driven or rotated in a ratio to the shafts and 1 and 13 in accordance with the change gear 15. For one particular filament, the ratio between the shafts 1 and 20 may be four to one which ratio will produce an eight leg folded filament on the machine being described.

For a purpose that will hereinafter be apparent, a rod 24 is slidably mounted in the hollow shaft 9. This rod rotates with the shaft 9. It is spring pressed, by a compression spring 25 (Fig. 3) in one direction and moved in the opposite direction (to the right as seen in Fig. 3), against the action of the spring 25, by the action of a electromagnetic solenoid 26. When energized, the solenoid draws in, or down, its armature 26a. The armature 26a is connected to the end of one arm 27 of a bell crank lever 28, the other arm 29 of which engages the end of the rod 24. Thus, the rod 24 is spring pressed to the left (as seen in Fig. 3) and moved against the spring pressure upon energization of the solenoid 26.

The winding or folding head B (Figs. 6 and 7) is mounted on the end of the shaft or spindle 9 for rotation therewith. This folding head includes a housing that consists of an end wall 30 having a bushing or hub 31 formed integral therewith. The bushing 31 is fitted upon the shaft 9 and secured thereto for support of the housing and for rotation therewith. Top, bottom and side walls 32, 33 and 34 connect the end wall 30 with an end wall 35 and the several walls mentioned constitute the housing of the folding head B.

The rod 24 has a tongue-like extension 35 on the end thereof which is oblong in cross section. To this extension, one on each side thereof, there is secured a pair of spaced plates 36. These plates extend into the folding head B and therein have angular edges 37 which extend at an angle to the axis of the rod 24 and in effect act as wedges in the actuation of oppositely disposed knife carriers 38 and 39. These knife carriers are identical in construction. The carrier 38 includes a cylindrical portion 40 mounted radially of the axis of the shaft 9 and slidably mounted in a bushing 41 fixed in the housing of the folding head. Extending radially from the inward end of the cylindrical portion 40 there is a tongue 42 which enters between the plates 36 at the wedge-shaped portions. The end of the cylindrical portion 40 is shaped as shown at 43 to engage the wedge-shaped edges of the plates 36. An axial extension 44 of the tongue 42 has secured thereon a winding or folding blade 45. A like folding blade 46 is carried by the blade carrier 39. The blade carrier 38 is spring pressed into contact with the wedge-shaped edges of the plates 36 by a compression spring 47 acting between the base of a bore 48 in the end of the cylindrical portion and the adjacent wall of the housing. A stop screw 49 adjustably limits outward movement of the blade carrier.

The wire from which the folded filament is formed is wound about the blades 45 and 46 into a flat coil. After a predetermined number of turns, the number to form the desired folded filament, the solenoid 26 is energized, in a manner hereinafter explained, to move the rod 24 against the action of the spring 25. Upon movement of the plates 36, to the right as seen in Fig. 6, the blade carriers move radially inwardly until the opposing edges of the tongues engage. A movement of about twenty thousandths of an inch is sufficient to release the folded filament and insure against scraping the coating at the folds as the folded filament is pushed off the end of the blades.

The folded filament is pushed off the end of the blades by a pusher 50 actuated by movement of the rod 24. The pusher 50 has an end section 51 having openings through which the blades extend, and it is mounted on a rod 52 extending from a block 53. The block 53 is received in recesses in the plates 36 and the tongues of the blade carriers. There is a clearance at 54 between the block and the adjacent edges of the plates 36. This clearance is to permit the plates 36 to move slightly before engaging the block and so moving the pusher. In this manner, the blades are first moved radially inwardly and then the pusher is moved, by engagement of the block with the edges of the plates 36, to push the folded filament toward the ends of the blades 45 and 46.

The separation of the blades 45 and 46 will depend upon the size or length of the folded filament desired. The particular blades shown are for an evenly wound or folded filament in which all of the legs are of the same length. This arrangement is suitable for low voltage filaments. For high voltage filaments it is desirable to have the legs of uneven length so that adjacent folds will not be in contact. When such filaments are wound the blades 45 and 46 are replaced with blades having stepped edges so as to form legs of unequal length in the folded filament, the wire being fed over the steps in the desired sequence.

The wire is fed to the blades through the wire feed mechanism (Figs. 1, 2, 8, 9, 10, 11, 12, 13 and 14). The wire is delivered wound on a cardboard cylinder, and the feed mechanism includes a holder for the cylinder. This holder consists of a drum 55 rotatably mounted upon a stub shaft 56 secured in a standard extending upwardly from a bracket 57 that is secured on the head stock (Fig. 2). The drum has leaf springs 58 which extend through slots therein and serve to engage the cylinder on which the wire is wound. A pulley 59 is secured to the drum and a tensioning arrangement is provided for providing a frictional force to prevent free rotation of the drum, and to maintain the wire fed to the folding head under tension. This tension arrangement consists of a belt secured at one end, through a spring 60, to a pin 61, and at the other end to a thumb screw 62 threaded through a lug 63. The wire from the drum passes beneath a V-grooved reel 64 loosely mounted on a stub shaft 65, through a busser cleaner 66, over a reel 67, partially around a reel 68 and down to guide rollers 69.

As the wire is folded over the blades 45 and 46, the velocity of the wire at the blades varies from a maximum to a minimum as the blades are rotated at a constant speed. Without some compensation, this action would result in a jerky take-off and under certain conditions snap the wire. To avoid this difficulty, compensating mechanism is provided which acts through the reel 68. This reel is mounted at one end of an arm 70 that is pivotally secured at the opposite end to the bracket 57. The compensating mechanism acts through the arm 70 to raise and lower the reel 68 and so adds to or takes from the length of the wire and maintains a constant take-off from the drum.

For this purpose, one end of a vertically extending rod 71 is connected, through a link 72, to the arm 70. The lower end of the rod 71 is pivotally connected to one arm 73 of a bell crank lever 74. The other arm 75 of the lever 74 carries a slidably mounted block 76 which may be adjusted, through an adjusting screw 77, with respect to the pivot 78 of the bell crank lever. A pair of links 79 are pivotally connected, at one end to the block 76 and at the other end to a lever 80, intermediate the ends thereof. The lever 80 is pivoted at one end to a bracket 81 and at the other end carries a cam follower 82 which cooperates with a cam 83. The arm 70 is resiliently urged, by a spring, in a direction to maintain the cam follower in contact with the edge of the cam 83. This cam 83, which is mounted on the shaft 13, is so designed as to compensate, through the movement of the reel 68, for the irregularity in the winding to produce the folded filament. The adjustable block 76 may be positioned or adjusted in accordance with the length of the legs, or the separation of the blades 45 and 46, of the folded filament.

The busser cleaner is for the purpose of cleaning the coating from the wire to provide bare or uncoated end portions at the ends of a folded filament. It is actuated intermittently, in a manner hereinafter described, and in timed relation to provide a bared portion that will serve for the end lead of one filament and the starting lead of the next filament. This busser cleaner includes an electromagnet 84 mounted on a plate 85. The magnet acts upon a resilient armature 86 which has an extension 87 extending into an opening in a plunger 88. A rubber bushing 89 is provided for engaging the extension 87. The plunger is slidably mounted in a bracket 90, mounted on the plate 85, and carries a head 91 having a fibre end piece 92. The fibre end piece is opposite a hardened steel anvil 93 mounted in a bracket 90. The wire passes between the fibre end piece 92 and the anvil 93. When the busser operates, the plunger 88 is vibrated and the fibre end piece 92 impacts the wire against the anvil at a vibratory rate. This results, without undue clamping of the wire, in freeing the coating from the wire as it moves along. The frequency of operation of the busser will, of course, depend upon the length of the folded filament and the duration of operation will depend upon the desired length of the lead.

From the busser cleaner, the wire passes over the reel 68 and between guide rollers 69 and to the blades 45 and 46 of the winding head. The guide rollers are mounted on a lever which, as hereinafter described, is moved to cause the wire to traverse, in the desired manner over the blades. This construction includes a U-shaped bracket 94 in which the rollers 69 are rotatably mounted on centering set screws 95 threaded through the arms of the bracket. A rod 96 extends from one arm of the bracket 94 and is secured in an opening in a block 97 by a set screw 98. Another rod 99 depending from the block 97 is received in a hollow post 100, secured in and extending upwardly from the end of a lever 101, which is pivoted intermediate its ends on a pivot 102 extending from another lever 103. On the opposite end of the lever 101, there is mounted a cam follower 104 which engages a face cam 105 secured on the cam shaft 20.

The lever 103 is pivoted at one end on a bracket 106 (Fig. 2) mounted on the bed 107 of the machine. On the opposite end of the lever 103, there is a cam follower 108 which engages a face cam 109 (Figs. 2 and 13) also mounted on and secured to the shaft 20. The nature of the cams 105 and 109 depend upon whether straight edge folding or winding blades are used, such as the blades 45 and 46, or whether stepped blades, for making filaments of uneven legs, are used. The cams illustrated are for straight edge blades.

For straight edge blades, the cam 109 has one rise and one depression, and the cam 105 has a constant rise for feeding successive loops and a rise for bringing the wire over the wire cutter. The movement of the levers 101 and 103, by virtue of the cams 105 and 109 is such as to move the guide rollers 69 to effect a winding such as is illustrated in Fig. 14. In describing this movement, reference being had to Figs. 13 and 14, it is assumed that one filament has been folded and moved into the clamping or carrying jaws hereinafter described. In the start of the winding of a folded filament, the wire is grabbed and held by the cutter of the clamping and cutter head which rotates at the same speed as the winding head. At this point, the cam follower 108 enters the dip or depression of the cam 109. This moves the rollers 69 to the left, as seen in Figs. 1 and 13, and carries the wire 110 to a point, such as the point 111, on the blade 46. As the blades rotate and the wire passes over the edge of the blade 45, as at 112, the cam follower 108 is engaged by the rise in the cam 109. The guide rollers are then moved slightly to the right, as seen in Fig. 13, and carries the wire to the left to cross the first layer, as at 113, and so anchor the first leg of the filament. Thereafter, the constant rise of the cam 105 comes into play and moves the rollers, to the right as seen in Figs. 1 and 13, to effect the constant pitch in the winding or folding of the wire over the blades. After the required number of turns is effected, the cam follower 104 is engaged by the abrupt rise in the cam 105 and the feed rollers are moved sharply to the right, as seen in Figs. 1 and 13, to carry the wire, as shown at 114 in Fig. 14, so that it is engaged by the cutter head. The folded filament is then pushed by the pusher 51 into the clamping jaws, as will hereinafter be described, and the cycle is repeated. After, the anchoring turn, the wire is cut so that the folded filament in the clamping jaws is free and may be moved to a position to be received in the receiving receptacle.

The cutter and clamp jaw head is mounted on the end of a hollow shaft or spindle 115 which extends from the tail stock toward the winding head. On the end of the shaft 115, there is mounted and secured to the shaft a grooved collar 116. From this collar 116, a supporting plate 117 extends toward the winding head. The shears or cutters and clamping jaws are mounted on this supporting plate. The clamping jaws 118 and 119 are formed at the end of levers 120 and 121 pivoted on a common pivot 122 secured in a block 123 that is mounted on the supporting plate. The levers are spring pressed, by a coil spring 124 to the position in which the jaws are closed. The end of the levers 118 and 119, opposite the jaws, are shaped as shown in Fig. 18 to receive an actuator head 125 which, when moved forward towards the pivot, as hereinafter described, moves the levers to open the jaws against the action of the spring 124.

The cutter which is also supported by the supporting plate includes a movable lug 126 which extends slightly beyond the jaws and has a groove 127 therein and a shearing edge 128. A fixed shear blade 129 cooperates with the shearing edge 128. This blade is secured in position to cooperate with the shear edge 128 of the lug 126. The movable lug is actuated by a slidable rod 131. Upon movement of the rod 131 to the left, Figs. 15 and 16, the lug 126 is moved away from cutting position; movement in the opposite direction brings the blade into a shearing action.

The shear lug 126 and the clamping jaws are actuated by longitudinal movement of a rod 132 slidably mounted in the shaft 115 and extending through the end thereof. On the end of the rod 132, there is secured a fixture 133 having the actuator head 125 formed thereon. A square pin 134 extends from the fixture and between arms 135 and 136 formed on the shear blade actuator 131. Set screws 137 and 138 are threaded through the arms 135 and 136 respectively and are in position to engage the pin 134 upon movement of the rod 132. A spring 139 secured at one end to a pin 140 fixed in the rod 131 and at the other end to a fixed pin 141, serves, as hereinafter explained, to move the lug 126 to a clamping or wire holding position with respect to the blade 129.

The cutter and clamping head is moved from a retracted position (Fig. 1) to an advanced position, with the clamping jaws adjacent the winding blades, through a bifurcated lever 142. This lever is mounted on the end of a shaft 143 journaled in a bearing bracket 144 that is mounted on the bed plate 107. On the arms of the bifurcated lever 142, there are rollers 145 extending into the grooved collar 116 fixed on the shaft 115. On the opposite end of the shaft 143, there is secured an arm 146 having a cam follower 147 thereon which engages a cam 148 mounted on the shaft 20. Through the cam 148 and the cam follower 147, the cutter and clamping head is advanced and retracted in timed relation to the winding head.

The shaft 115 is slidably mounted in a sleeve 149 in the tail stock and keyed thereto, and extends beyond the tail stock. The rod 132 which extends through the shaft 109 has a grooved collar 150 secured on the end thereof. A bifurcated lever 151, mounted on one end of a transverse shaft 152 has rollers 153 thereon engaging in the groove of the collar 150. The shaft 152 is journaled in a bearing bracket 154, and on the opposite end thereof, there is secured an arm 155 carrying a cam follower 156 that engages a cam 157 mounted on the shaft 20. Through this cam the rod is actuated, as hereinafter described.

The shaft 13 extends into the tail stock and has mounted on the end thereof a spur gear 158 which meshes with a spur gear 159, in a one to one ratio. The gear 159 is loosely mounted on the sleeve 149 and connected to the sleeve 149 to effect the rotation thereof and the shaft 115, which is keyed to the sleeve, through a clutch 160. This clutch includes a plate 161 secured to the gear by machine screws 162 and pins 162a. These screws extend through slots 163 in the plate so that the plate may be adjusted to secure the proper timing. On the edge of the plate there is a gradual depression ending in a shoulder 164 which cooperates with a hook-shaped end 165 of a pivotally mounted lever 166. The lever 166 is pivoted between its ends on a pivot 167 extending from a radially extending plate 168 formed on the sleeve 149. The lever is spring pressed in a direction to keep the hook-shaped end 165 in engagement with the edge of the plate 161. The opposite end of the lever 166 is shaped as shown for engagement with the end of a control lever 169.

Through the control lever 169, the operation of the clutch is effected. This lever is pivoted between its ends at 170 and has an abutment end piece 171 secured on one end thereof and positioned to engage the lever 166. On the opposite end of the lever 166, there is a cam follower 172 which cooperates with a cam 173 mounted on the cam shaft 20. As shown in Fig. 22, the parts are in an intermediate position in which the sleeve is clutched to the gear and is rotating in a clockwise direction. The cam follower 172 is at the low part of the cam 173 and the end piece 171 of the control lever is in the path of the lever 166. As the lever 166 is engaged by the end piece 171, it is swung about its pivot and the hook-shaped end 165 is disengaged from the shoulder 164. The sleeve is thus declutched and ceases to rotate. When the cam follower 172 becomes engaged by the high point of the cam 173, the end piece 171 is moved away from and out of the path of the lever 166. The hook-shaped end of the lever then engages the edge of the plate 161 and becomes engaged with the shoulder 164 when it moves around to engaging position.

On the reduced end 174 of the shaft 20, which extends through an end bearing bracket 175 (Figs. 1, 2, 23 and 24), there are mounted a pair of adjustable arms 176 and 177 having conical shaped end pieces 178 and 179 respectively. These end pieces are adjusted and positioned to cooperate with plungers 180 and 181 on electrical switches 182 and 183 respectively. As the end pieces 178 and 179 pass the plungers 180 and 181, they engage cam followers on the ends of the plungers and effect actuation of the switches. The switch 183 controls the energization of the solenoid 26, and the switch 182 controls the energization of the busser cleaner.

In the retracted position of the jaws, a folded filament is positioned to be received in an opening in a receiving dial 184 when the dial is moved in toward the jaws. The dial is rotatably mounted on a stub shaft 185 secured in a lever 186 that is pivoted in a bracket 187 below the bed plate. A bar or link 188 extends from a point intermediate the ends of the lever 186 to one end of a lever 188a pivoted between its ends on a bracket 188b extending from an upright 188c. Another link 188d connects the other end of the lever 188a with a lever 189, between the ends thereof. The lever 189 is pivoted at one end in a bracket 190 and at the other end carries a cam follower 191. The cam follower 191 cooperates with an edge cam 192.

Through the cam 192 the receiving dial is moved toward the clamping jaws as represented by the dotted line position (Fig. 25) to receive a folded filament. In the edge of the dial there are a series of bushings 193 having openings therein to receive a folded filament. When the dial is moved toward the clamping jaws one of these openings is aligned with a folded filament held in the clamping jaws. As the folded filament is entered into the opening, the jaws open and release the filament. The dial is then returned and in returning, is indexed through a ratchet 194 and pawls 195, in a manner well-known in the art, to position the dial with the next opening in line with a filament held in the jaws. Cylindrical cathode sleeves may be substituted for the openings in the dial. With the dial, the folded filaments are removed manually and inserted in the cathode sleeve, for example.

In all instances where an edge or face cam is used, it is understood that a spring of requisite strength is used to maintain the cam follower in contact with the cam and effect the proper movement with the required force to move the mechanism when the cam follower enters a dip in a cam. For the purpose of simplifying the disclosure and for greater clarity, these springs have not been disclosed or described.

In Figs. 26 and 27, there is illustrated stepped blades 196 and 197 for folding filaments with unequal legs. The blade 196 has two steps 196a and 196b and the blade 197 has three steps 197a, 197b and 197c. In Fig. 27 one winding pattern is shown for folding a filament with these blades. The leg 198 represents the first leg of the filament and the leg 199 the last leg.

It is to be noted that, the lug 126 is radially displaced from the folding blades. Because of this, the first and last legs of a filament are longer than the other legs. This extra length is the portion from which the coating has been removed by the busser cleaner and constitute connecting leads for the folded filament.

At the start of the operation, the coated wire is manually threaded through the wire feed mechanism and between the guide rollers 69. The end of the wire is then wound about one of the fold blades 45 or 46 and the machine is ready for operation. The operator then effects the engagement of the clutch 8 and through the shaft 9, the winding head is continuously rotated. On the start of the winding, the first filament wound is discarded as the end is unsuitable, having been wound around one of the blades to start the operation. During the operation, the compensating mechanism (Fig. 12) is constantly operating to effect a uniform withdrawal of wire at a compensated speed from the drum 55, and the shafts 13 and 20 are rotated continuously.

As the last leg of a filament is being wound (Fig. 14), the cam 148 permits the advance of the cutter and jaw or take-off head D to a position adjacent the end of the folding blades. The clutch 160 now engages to rotate the shaft 115 at the same speed as the winding head through gears 11 and 12 (Fig. 5) shaft 13 and gears 158 and 159 (Fig. 21). At the same time as the cutter and jaw head is advanced, the cam 157 is so positioned that the rod 132 is moved forward, the clamping jaws 118 and 119 are opened and the shear lug 126 is moved out of shearing position. The cam follower 104 now meets the abrupt rise in the cam 105 and carries the wire (Fig. 14), as indicated by the leg 114 so that it overlies and is engaged in the groove 127 on the cutter lug 126. As the wire is engaged by the cutter lug 126, the rod 132 is retracted slightly, not enough to affect the jaw opening to any material extent, but just sufficiently so that the spring 139 moves the shear lug 126 to grip the wire by the shear blade 129. Practically simultaneously with this action, the arm 189 engages the plunger of the switch 183 and the solenoid 26 is energized for an instant. The rod 24 is thus actuated. The folding blades are thus retracted and the pusher 51 actuated to push the folded filament between the open jaws 118 and 119. The pusher is immediately retracted. In rapid sequence, almost simultaneously with the completion of the forward movement of the pusher, the rod 132 is retracted again a short distance to effect the closing of the jaws on the folded filament. The movement of the rod is, however, insufficient for the pin 134 to engage the abutment set screw 138 at the right (Fig. 15). Thus, the wire remains only gripped by the shear lug 126 and blade 129 under the light spring pressure of the spring 139.

As the rotation of the winding head and the cutter and jaw head continues (Figs. 13 and 14), the cam follower 108 successively enters the depression and engages the rise in the cam 109 to form the cross over and anchoring folds 110, 111 and 112, the cross over being at 113. The rod 132 is now fully retracted and the pin 134 engages the abutment screw 138, at the right (Fig. 15), to effect positive movement of the shear lug and cut the wire by the shear blade 129. The cutter and jaw head is now retracted, the abutment end piece 171 on the lever 170 falls into the path of the clutch lever 166, the shaft 115 carrying the cutter and jaw head is declutched and stops rotating with the face of the jaws 118 and 119, and in consequence, the folded filament, arranged parallel to the table, horizontal in the machine shown. The receiving dial is now moved in and as the folded filament is received in the opening aligned with the filament, the rod 132 is moved to its full forward position to open the jaws. The dial is now returned with the folded filament and indexed. This cycle is repeated over and over during the operation of the machine.

From the foregoing description of the embodiment of the invention illustrated in the drawings, it will be apparent that by this invention there is provided a machine for continuously folding a succession of folded filaments and inserting the folded filaments in a receptacle. It will be obvious that various changes may be made by those skilled in the art in the details of the illustrated embodiment of the invention within the principle and scope of the invention as expressed in the appended claims.

We claim:

1. In a machine of the kind described, the combination comprising means for folding wire upon itself to form a folded filament, said means including a rotatable arbor around which the wire is wound, means to rotate said arbor and to simultaneously feed said wire longitudinally of the axis of rotation of said arbor to form it into a flattened helix means for partially collapsing said arbor for releasing the folded filament from said folding means, means for receiving and transferring the folded filament in the folded condition from said folding means to a receptacle, and means for automatically operating said folding means and said transferring means in timed relation.

2. In a machine of the kind described, the combination comprising means for folding wire upon itself to form a folded filament, said means including a rotatable arbor around which the wire is wound, means to rotate said arbor and to simultaneously feed said wire longitudinally of the axis of rotation of said arbor to form it into a flattened helix means for partially collapsing said arbor for releasing the folded filament from said folding means, means for receiving the folded filament, means for transferring the folded filament from said folding means to said filament receiving means, and means automatically operating the said folding means and the said transferring means in timed relation.

3. In a machine of the kind described, the combination comprising means for folding wire upon itself to form a folded filament, said means including a rotatable arbor around which the wire is wound, means to rotate said arbor and to simultaneously feed said wire longitudinally of the axis of rotation of said arbor to form it into a flattened helix means for partially collapsing said arbor for releasing the folded filament from said folding means, a receptacle for the folded filament, means for transferring the folded filament to said receptacle, and means automatically operating said transferring means and said folding means in timed relation.

4. In a machine of the kind described, the combination comprising continuously operating wire folding means for folding wire continuously to form a continuous succession of zig-zag folded filaments, said means including a rotatable arbor around which the wire is wound, means to rotate said arbor and simultaneously to feed said wire longitudinally of the rotational axis of the arbor to form it into a flattened helix means for removing each folded filament as it is formed from the said folding means, means for severing the wire at the conclusion of each folded filament, means for anchoring the wire to said folding means for the start of the next succeeding folded filament, and means for automatically operating all said foregoing means in timed relation.

5. In a machine of the kind described, the combination comprising continuously operating wire-folding means for folding wire continuously to form a continuous succession of zig-zag folded filaments, said means including a rotatable arbor around which the wire is wound, means to rotate said arbor and to simultaneously feed said wire longitudinally of the axis of rotation of said arbor to form it into a flattened helix means for removing each folded filament as it is formed from said folding means, means for receiving each folded filament removed from said folding means, means for severing the wire at the conclusion of each folded filament, means for anchoring the severed wire to said folding means for the start of the next succeeding folded filament, a receptacle for the folded filament, means for moving said receiving means to position the folded filament received thereby with respect to the receptacle, means for effecting relative movement between the receiving means and the receptacle for inserting the folded filament in the receptacle, and means for automatically operating all the said foregoing means in timed relation.

6. In a machine of the kind described for folding wire into folded filaments, the combination comprising a rotatable folding head including spaced, folding blades extending therefrom, and movable radially of the folding head, means movable longitudinally of the folding blades for removing a folded filament from the folding blades, and means operable upon the start of operation of said filament removing means for effecting movement of the folding blades towards each other, whereby the filament is not scraped at the folds by the blades as it is removed therefrom.

7. In a machine of the kind described, the combination comprising a folding head on which the wire is folded, said means including a rotatable arbor around which the wire is wound, means to rotate said arbor and to simultaneously feed said wire longitudinally of the axis of rotation of said arbor to form it into a flattened helix means for removing a folded filament from the folding head including opposed relatively movable jaws resiliently urged to closed position, means for opening the jaws, means for positioning the opened jaws to receive a folded filament as it is removed from the folding head and releasing the jaws thereon, means for moving the jaws away from the folding head, means for opening the jaws and removing the folded filament therefrom, and means for operating said foregoing means automatically in timed relation.

8. In a folding machine of the kind described for folding wire into folded filaments and the like, the combination comprising a rotatable folding head, means for feeding wire to said folding head including movable wire guide means for guiding the wire on to the folding head, means for holding the wire during the first loop of a fold, and means for moving said wire guide means to cause one leg of the fold to cross over another, whereby the wire is anchored to the folding head.

9. In a folding machine of the kind described for folding wire into folded filaments and the like, the combination comprising a rotatable folding head, means for feeding wire to said folding head including movable wire guide means for guiding the wire on to the folding head, means for holding the wire during the first loop of a fold, means for moving said wire guide means to cause one leg of the fold to cross over another, whereby the wire is anchored to the folding head, and means for thereafter moving the guide means to effect a predetermined pattern in the folding of the wire.

10. In a folding machine of the kind described for folding wire into folded filaments and the like, the combination comprising a rotatable folding head, means for feeding wire to said folding head including movable wire guide means for guiding the wire on to the folding head, means for holding the wire during the first loop of a fold, means for moving the said wire guide means to cause one leg of the fold to cross over another, whereby the wire is anchored to the folding head, and means for thereafter severing the wire at the holding means.

11. In a folding machine of the kind described for folding wire into folded filaments and the like, the combination comprising a rotatable folding head, means for feeding wire to said folding head including movable wire guide means for guiding the wire on to the folding head, means for holding the wire during the first loop of a fold, means for moving the said wire guide means to cause one leg of the fold to cross over another, whereby the wire is anchored to the folding head, means for thereafter severing the wire at the holding means, and means for moving the guide means to effect a predetermined pattern in the folding of the wire.

12. In a folding machine of the kind described for folding wire into folded filaments and the like, the combination comprising a rotatable folding head, stepped folding blades extending from said folding head about which the wire is wound, movable wire guide means for guiding the wire on to said folding blades, and means for moving said wire guide means to effect a predetermined pattern in guiding the wire over the folding blades.

13. In a folding machine of the kind described for folding wire into folded filaments and the like, the combination comprising a rotatable folding head, folding blades on said head, means for guiding wire to the folding blades, and means for severing the wire at the end of each folded filament, said severing means being spaced radially of said folding blades, whereby the first and last legs of a filament are longer than the intermediate legs.

14. In a machine of the kind described, the combination comprising, means for folding wire upon itself to form a folded filament the said means including a rotatable arbor around which the wire is wound, means to rotate said arbor and to simultaneously feed said wire longitudinally of the axis of rotation of said arbor to form it into a flattened helix, means for partially collapsing said arbor for releasing the folded filament from said folding means, a receptacle for the folded filament, means for inserting the folded filament into the receptacle, and means automatically operating said folding means and said inserting means in timed relation.

GERHARD GUNTHER SCHNEIDER.
FRANK L. DONOHUE.

REFERENCES CITED

The following references are of record in the file of this patent:

UNITED STATES PATENTS

| Number | Name | Date |
| --- | --- | --- |
| 836,977 | Kelley | Nov. 27, 1906 |
| 585,905 | Madden et al. | May 25, 1926 |
| 1,696,121 | Huyett | Dec. 18, 1928 |
| 1,801,108 | Reufel et al. | Apr. 14, 1931 |
| 1,896,670 | Garst | Feb. 7, 1933 |
| 1,928,786 | Huyett | Oct. 3, 1933 |
| 1,958,879 | Stuart, 2d | May 15, 1934 |
| 1,983,141 | McFarland | Dec. 4, 1934 |
| 2,008,618 | Lefebvre | July 16, 1935 |
| 2,189,557 | Ashcroft | Feb. 6, 1940 |
| 2,227,602 | Platt | Jan. 7, 1941 |
| 2,306,466 | Patterson | Dec. 29, 1942 |
| 2,312,845 | Nichols et al. | Mar. 2, 1943 |